(12) United States Patent
Zelakiewicz et al.

(10) Patent No.: US 8,129,686 B2
(45) Date of Patent: Mar. 6, 2012

(54) MASK FOR CODED APERTURE SYSTEMS

(75) Inventors: Scott Stephen Zelakiewicz, Niskayuna, NY (US); Jeffrey Seymour Gordon, Niskayuna, NY (US)

(73) Assignee: Morpho Detection, Inc., Newark, CA (US)

( * ) Notice: Subject to any disclaimer, the term of this patent is extended or adjusted under 35 U.S.C. 154(b) by 1178 days.

(21) Appl. No.: 12/122,447

(22) Filed: May 16, 2008

(65) Prior Publication Data

US 2012/0025092 A1     Feb. 2, 2012

Related U.S. Application Data

(60) Provisional application No. 60/971,695, filed on Sep. 12, 2007.

(51) Int. Cl.
  *G01T 1/161* (2006.01)
(52) U.S. Cl. ................................. 250/363.06
(58) Field of Classification Search ............. 250/363.06
  See application file for complete search history.

(56) References Cited

U.S. PATENT DOCUMENTS

| 5,036,546 | A | 7/1991 | Gottesman et al. |
| 6,194,728 | B1 | 2/2001 | Bosnjakovic |
| 6,205,195 | B1 | 3/2001 | Lanza |
| 6,236,050 | B1 | 5/2001 | Tümer |
| 6,737,652 | B2 | 5/2004 | Lanza et al. |
| 7,183,554 | B2 | 2/2007 | Gallagher et al. |
| 7,214,947 | B2 | 5/2007 | Bueno et al. |
| 2006/0065844 | A1 | 3/2006 | Zelakiewicz et al. |
| 2006/0284094 | A1 | 12/2006 | Inbar |
| 2009/0008565 | A1 | 1/2009 | Gottesman |

FOREIGN PATENT DOCUMENTS

WO   WO 2006125975 A1 * 11/2006

OTHER PUBLICATIONS

Office Action dated Jan. 20, 2010, U.S. Appl. No. 12/122,471, 22 pages.

* cited by examiner

*Primary Examiner* — Constantine Hannaher
(74) *Attorney, Agent, or Firm* — Armstrong Teasdale LLP (57) ABSTRACT

A coded aperture includes a position sensitive detector configured to observe the location of emitted high energy radiation, and a mask disposed in front of the position sensitive detector, wherein the mask has a non-linear shape configured to define a perimeter around position sensitive detector, wherein the mask comprises a plurality of attenuating and transparent elements of a predetermined configuration, positioned such that the emitted radiation is detected by the position sensitive detector after passage through the mask.

20 Claims, 5 Drawing Sheets

FIG. 7 though the county's borders.

MASK FOR CODED APERTURE SYSTEMS

CROSS-REFERENCE TO RELATED APPLICATIONS

This application claims the benefit of U.S. Provisional Application Ser. No. 60/971,695, filed Sep. 12, 2007, which is incorporated herein by reference in its entirety.

BACKGROUND

The present disclosure generally relates to masks for coded aperture systems and methods of using the masks, and more particularly, to masks that maximize the field of view for stand-off radiation detection and imaging systems.

Given the desire of terrorist organizations to obtain nuclear weapons or other radiological weapons such as "dirty" bombs, serious efforts are being made to assess this nation's vulnerabilities and to enhance the nation's security. Potential areas of vulnerability can include, for example, seaports, airports, urban areas, borders, stadiums, points of interest, and the like. In U.S. seaports, for example, an average of about 16,000 cargo containers arrive by ship every day, any one of which could be used to conceal fissile material or an assembled nuclear device. Furthermore, once in the country, the nuclear material could travel virtually anywhere in the country with little to no detection capability.

A currently prevailing model for addressing such threats associated with potentially reactive material could be characterized as a customs-based approach, where radiation detection systems are integrated into the existing customs infrastructure at ports and border crossings. Once the containers leave the customs area, additional screening methods are required to investigate potential threats once within the county's borders.

Several methods exist for detecting nuclear material once within the nation's borders. These systems largely consist of devices which can detect radiation but neither definitely locate the source or discriminate between naturally occurring sources of radiation and genuine threats. The devices include small pager-size devices and larger Geiger-counter based detectors. These devices rely on measuring a local increase in the detection of gamma-rays to determine the presence of radioactive material. Because they do not perform any imaging or energy discrimination, they often indicate false-positive threats potentially leading to ignoring true threats. To passively detect and locate radioactive material that could be used in potential terrorism threats domestically, several technologies have been considered. Attenuating collimators to achieve the radioactive localization suffer from low efficiencies and can have significant weight issues to attenuate high energy gamma-rays. Compton cameras can be used due to their localization abilities, but their inherent inefficiencies at low radiation energies, high cost, and high system complexity make them undesirable for such applications.

Systems for detecting radioactive material can employ coded aperture imaging. Coded aperture imaging provides a means for improving the spatial resolution, sensitivity, and signal-to-noise ratio (SNR) of images formed by x-ray or gamma ray radiation. For many imaging applications involving the detection of contraband-type radioactive material, coded aperture cameras have proven advantageous relative to other candidate systems, including the single pinhole camera and multihole collimator systems. In contrast to these other systems, for instance, the coded aperture camera is characterized by high sensitivity, while simultaneously achieving exceptional spatial resolution in the reconstructed image.

Sources of such high energy electromagnetic radiation (i.e., X-ray, gamma-ray or neutron sources) are generally imaged by coded aperture arrays onto a detector which has detector elements arranged in a pattern of rows and columns. Imaging techniques based on coded apertures have been successfully applied by the astrophysics community, and are being developed for national security purposes.

Current coded aperture systems utilize a mask with multiple, specially-arranged pinholes or transmission regions to increase the overall photon transmission, and hence the sensitivity, of the imaging camera. In operation, radiation from the object to be imaged is projected through the coded aperture mask and onto a position-sensitive detector. The coded aperture mask contains a number of discrete, specially arranged elements that are either opaque or transparent to the incident photons. Every point source within the detector's field of view casts a shadow of the aperture pattern onto the detector plane. Each shadow is displaced an amount commensurate with the angular displacement of the point source from the system's central axis. The sum total of the radiation pattern recorded by the detector constitutes the "coded" data, which usually bears no resemblance to the actual source. The raw signal from the detector does not reflect a directly recognizable image, but instead represents the signal from the object that has been modulated or encoded by the particular aperture pattern. This recorded signal can then be digitally or optically processed to extract a reconstructed image of the object.

Figure 1:
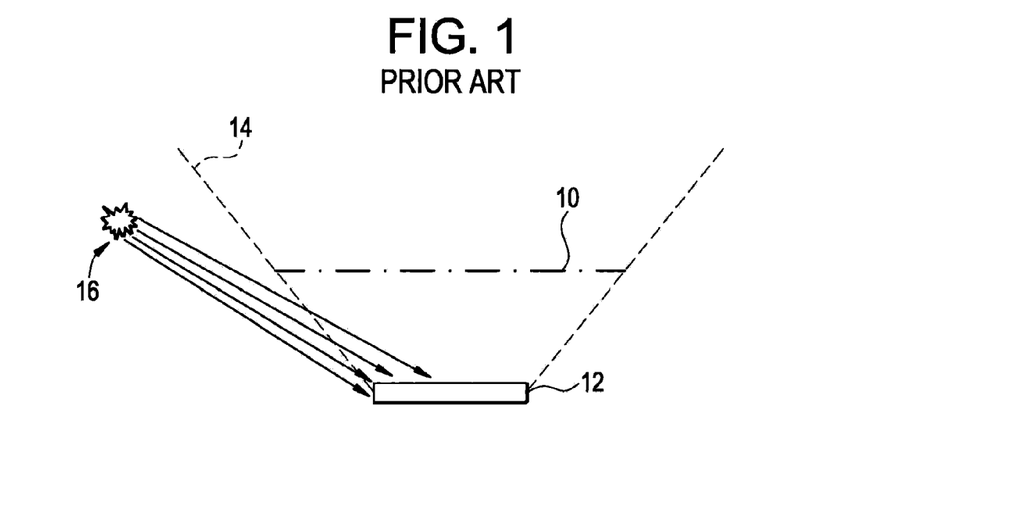
FIG. 1 schematically illustrates a prior art coded aperture system.

The aperture mask is typically a one- or two-dimensional planar array of the occluding and transmission regions. The mask is typically significantly larger than the position-sensitive detector (PSD) to maximize the field of view. Prior art FIG. 1, is a simplified illustration of a standard aperture mask 10 in front of a PSD 12. The angle subtended by the mask 10 and the PSD 12 determines the field of view, i.e., the fully encoded region. Dashed lines 14 are shown to represent the field of view. As can be seen, the larger the mask, the wider the field of view. The mask, therefore, is often made larger to trade off the overall detector size for a wider field of view. This can be undesirable, however, for radiation detection systems that are meant to be portable since it means a relatively small fraction of the overall detection system size will be sensitive to the incident radiation. In other words, the mask is one of the main determining factors in the size and portability of the detection system.

Another problem associated with the current coded aperture imaging detection systems, such as those represented in FIG. 1, is when a source (such as the source 16) is outside the field of view (i.e., outside the fully encoded region, or past the mask angle), ghost images can appear on the side lobes of the reconstructed imaging of the source object. This can lead to various problems, such as false source quantity, location, magnitude, and the like.

To reiterate, a standard coded aperture system with a typical coded mask can be used, but suffers from a modest radiation sensitive area, and impractical system size for transport. Such a standard coded aperture system, therefore, may not be desirable for a standoff radioactive imaging system application, particularly wherein it is desirable for the system to be easily transportable.

BRIEF SUMMARY

Disclosed herein are embodiments of an improved coded aperture mask, imaging system, and methods of using the same. In one embodiment, a coded aperture mask comprises a position sensitive detector configured to detect emitted high energy radiation, and a mask disposed in front of the position sensitive detector, wherein the mask has a non-linear shape configured to define a perimeter around position sensitive detector, wherein the mask comprises a plurality of attenuating and transparent elements of a predetermined configuration, positioned such that the emitted radiation is detected by the position sensitive detector after passage through the mask.

In another embodiment, a coded aperture comprises a position sensitive detector configured to detect a radiation source; and a mask comprising a plurality of attenuating and transparent elements disposed in front of the position sensitive detector, wherein the mask has a non-linear shape configured to define a perimeter around the position sensitive detector, wherein the mask comprises a width less than or about equal to a width of the position sensitive detector, and wherein at least a portion of the mask is in contact with the position sensitive detector to form the perimeter.

A method of detecting a radiation source comprises loading a stand-off radiation imaging and detection system aboard a vehicle, wherein the system is configured to detect the radiation source and comprises a mask disposed in front of a position sensitive detector, wherein the mask has a non-linear shape configured to define a perimeter around the position sensitive detector, wherein the mask comprises a plurality of attenuating and transparent elements of a predetermined configuration, positioned such that the emitted radiation is detected by the position sensitive detector after passage through the mask, and wherein the detector has a field of view of greater than 2 radians; recording detection of gamma radiation by the system; and determining the location of the radiation source.

These and other features and advantages of the embodiments of the invention will be more fully understood from the following detailed description of the invention taken together with the accompanying drawings. It is noted that the scope of the claims is defined by the recitations therein and not by the specific discussion of features and advantages set forth in the present description.

Skilled artisans will appreciate that elements in the figures are illustrated for simplicity and clarity and have not necessarily been drawn to scale.

DETAILED DESCRIPTION OF EMBODIMENTS OF THE INVENTION

Disclosed herein is a process for improved field of view as it relates to a stand-off radiation detection and imaging system. The system comprises a coded aperture detector for detecting and resolving multiple radioactive sources. Particularly, disclosed herein is an improved mask for the coded aperture of the system. The mask maximizes the coded aperture field of view while minimizing the overall size (i.e., footprint) of the radiation imaging system. The stand-off radiation imaging system, therefore, is of a size suitable for transportation in a vehicle, such as a sport-utility vehicle (SUV), van, pick-up truck, and the like.

Figure 2:
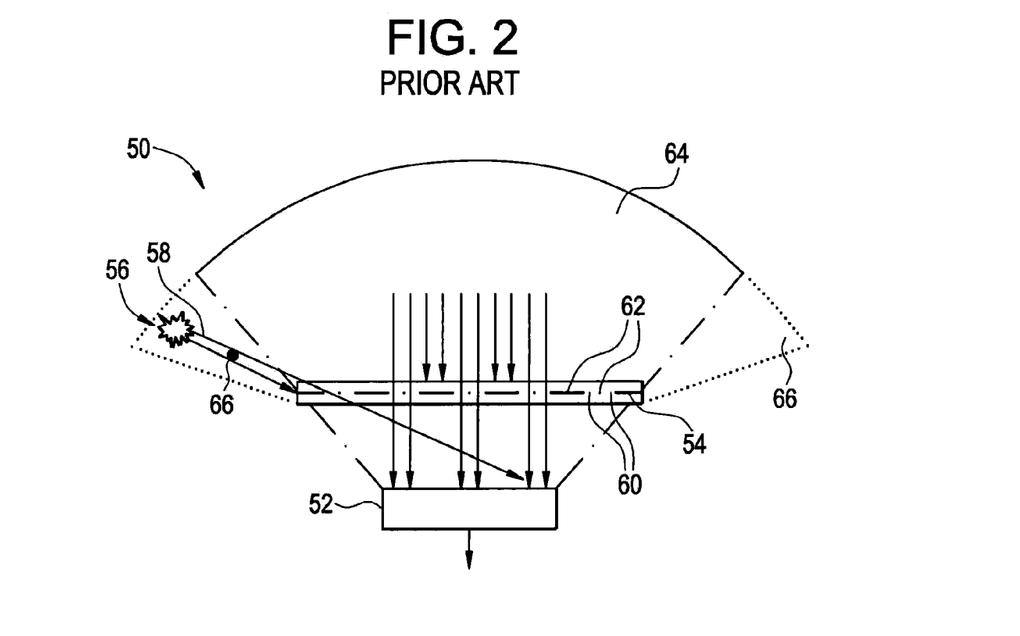
FIG. 2 schematically illustrates a second prior art coded aperture system comprising a linear mask and shows the fully encoded field of view for the system.

Turning now to FIG. 2, another prior art coded aperture 50 is illustrated. In simple terms, the coded aperture 50 comprises a position-sensitive detector (PSD) 52 and a coded aperture mask 54 disposed between the PSD 52 and a radioactive source 56. The radiation source 56 emits radiation 58, such as, but not limited to, x-ray and/or gamma-ray radiation, that is modulated by the coded aperture mask 54 and impinges upon the PSD 52. As illustrated in prior art FIG. 2, the mask 54 generally comprises a plurality of open transparent regions 60 and closed regions 62 that are substantially opaque to the radiation emitted by the source. The pattern of the mask elements are usually chosen to be non-periodic, such as a pseudo-random sequence, to minimize ghosting artifacts when the source is in the field of view. The mask casts a shadow, patterned with the open 60 and closed 62 regions, on the PSD 52. The shadow can shift position depending on the source's location. The fully coded region 64 of the coded aperture 50 is illustrated by the darkened section. The fully coded region 64 is the area in the field of view of the detector 52. The coded aperture can resolve and locate a radioactive source in this region. A second, partially coded region 66, exists outside the field of view of the PSD 52 and is framed by the dotted lines. The radioactive source 56 is in this partially coded region 66. Image construction of the radiation from the source in this location will be inaccurate and exhibit ghosting, thereby increasing the difficulty of determining the actual location of the radiation source. Ghosting is a term used to describe the tendency of a coded aperture to show more sources in various locations than is actually the case, because the source is located outside the fully coded region of the detector, or due to imperfections in the mask design, or due to noise in the imaging system. To improve the field of view of the prior art coded aperture 50, a larger (i.e., wider) mask must be used, or the separation distance between the mask and the PSD must be decreased. The former trades off the overall detector size for a wider field of view. Increasing the mask size further increases the system footprint, something that is undesirable for a transportable radiation imaging system. Further, the larger mask size decreases the overall efficiency of the detector since a smaller fraction of the total system size is sensitive to radiation. Also, decreasing the distance between the mask and PSD will require a corresponding decrease in the PSD pixel size in order to give a similar angular resolution. This can increase the expense and further reduce the efficiency of the transportable radiation imaging system.

Figure 3:
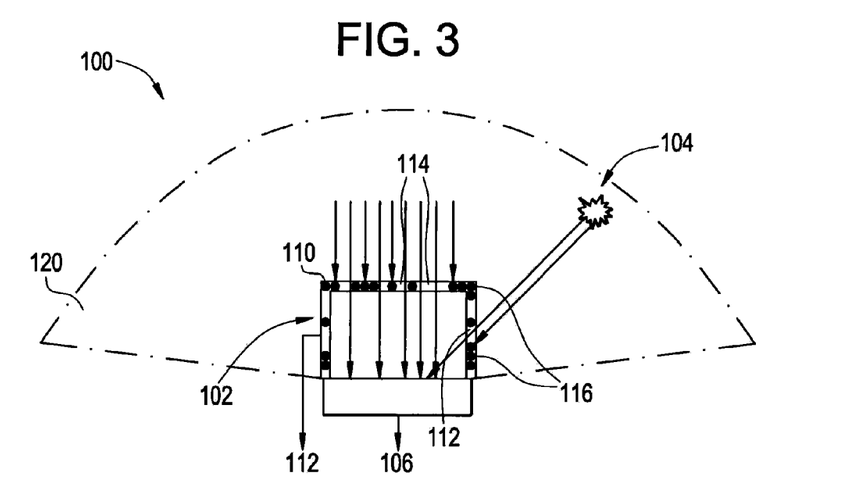
FIG. 3 schematically illustrates an exemplary embodiment of a non-linear mask in a coded aperture system and shows the fully encoded field of view for the system.

FIG. 3 illustrates an exemplary embodiment of a coded aperture system 100 comprising a non-linear aperture mask 102. The non-linear mask 102 is disposed between a radiation source 104 and a PSD 106. In one embodiment, the mask is configured to form a perimeter around the PSD, such that the mask extends down to the edges of the PSD, essentially wrapping around to cover the angle of view for the entire PSD surface. The non-linear mask 102 wraps around the PSD 106 while still having a suitable separation therebetween. The wrap-around or non-linear shape of the aperture mask disclosed herein is not limited to the embodiment shown in FIG. 3. The mask 102 can have any non-linear shape that increases the field of view of the coded aperture system 100 without necessitating an increase in size of the system due to a mask that is significantly larger (i.e., wider) than the PSD. Exemplary non-linear mask shapes can include, without limitation, U-shape, arc, semicircle, parabolic, polygonal, box-shape, and the like. In another embodiment, the mask 102 does not have to reach to the edges of the PSD. The mask can be formed as a single part, or it can comprise multiple pieces. In one embodiment, the coded aperture mask disclosed herein enables a field of view of about 2.5 radians.

In FIG. 3, the mask 102 comprises three sections, a front section 110 and two side sections 112. The front section 110 is disposed in front of and parallel to the PSD 106. The front section 110 can be spaced a suitable distance from the PSD 106 and will depend upon, among other things, the dimensions of the PSD, the PSD pixel size, and the like. In an exemplary embodiment, the non-linear mask 102 is separated from the PSD 106 by a distance of about 1 centimeter (cm) to about 1 meter (m), specifically about 0.4 meters to about 0.7 meters, more specifically about 0.6 meters. In some embodiment, where the side sections extend down to the PSD, the space between the side sections and the PSD can be less than about 10 centimeters, specifically less than about 5 centimeters, more specifically less than about 2 centimeters. The overall height of the mask can be approximately at least as high as the PSD 106. The width of the front section 110 can be the same size as, or larger or smaller than, the PSD 106, so long as the side sections 112 are configured to connect the front section 110 to the edges 108 to form the non-linear mask 102. In this embodiment, therefore, the mask 102 forms a U-shape. As previously stated, in another embodiment, the mask can have any non-linear shape to enhance imaging performance or reduce the required mask elements. The mask can also comprise any number of sections (i.e., segments), tiers, or elements, depending on the PSD and the desired overall detection system efficiency. The use of the side sections 112 of FIG. 3 ensure that the image generated on the PSD always represents an encoded image, regardless of the position of the radiation source. This permits the overall imaging system to be compact. Systems employing the current linear masks need to have a mask that is significantly larger than the PSD to ensure that a source falls within the narrower field of view of the linear mask.

The coded aperture mask as disclosed herein can be employed in any coded aperture system. An example of such a system can be found in, for example, a stand-off radiation detection and imaging system. Referring to the drawings in general and to FIG. 3 in particular, it will be understood that the illustrations are for the purpose of describing a particular embodiment of the coded aperture mask disclosed herein and are not intended to be limited thereto.

The mask 102 further comprises a plurality of open transparent regions 114, and closed regions 116 that attenuate the radiation emitted by a source. The mask casts a shadow, patterned with the open 114 and closed 116 regions, on the PSD 106. The shadow can shift position depending on the source's location. The fully coded region 120 of the coded aperture 100 is illustrated by the darkened section. The fully coded region 120 is the area in the field of view of the detector 106. The coded aperture can resolve and locate a radioactive source in this region. As can be seen, particularly when compared to the fully coded region 64 of the coded aperture system 50, the non-linear mask 102 advantageously widens the field of view for the detector 106. The use of the side sections 112 ensure that the image generated by the PSD 106 always represents an encoded image regardless of the source position. Previously, this could only be accomplished by having a linear mask large enough to extend far beyond the edges of the PSD and widen the field of view to include the source. In most practical situations a linear mask would provide a smaller field of view due to limitations on the size the mask can be made relative to the PSD size. The non-linear mask 102 described herein provides an improvement in that the field of view for the detector is maximized without making the mask many magnitudes larger than the PSD. The front section 110 of the non-linear mask, therefore, has an overall-length that can be less than or equal to the length of the PSD. In some embodiments, the non-linear mask can be designed such that the front section is wider than the PSD to optimize the imaging performance, but this is generally undesirable if the mask size increases the overall footprint of the detection system, because it makes the system less convenient for transportation. In other embodiments, the non-linear mask can also follow an arc, semicircular or any other exemplary non-linear shape. The overall footprint of the coded aperture system 100 is smaller than existing coded aperture systems providing an equal field of view with a standard linear mask. The decreased size of the coded aperture 100 allows the system to be transported in a much smaller vehicle, such as for example, an SUV or van, as opposed to a tractor trailer, rail car, or the like.

Figure 4:
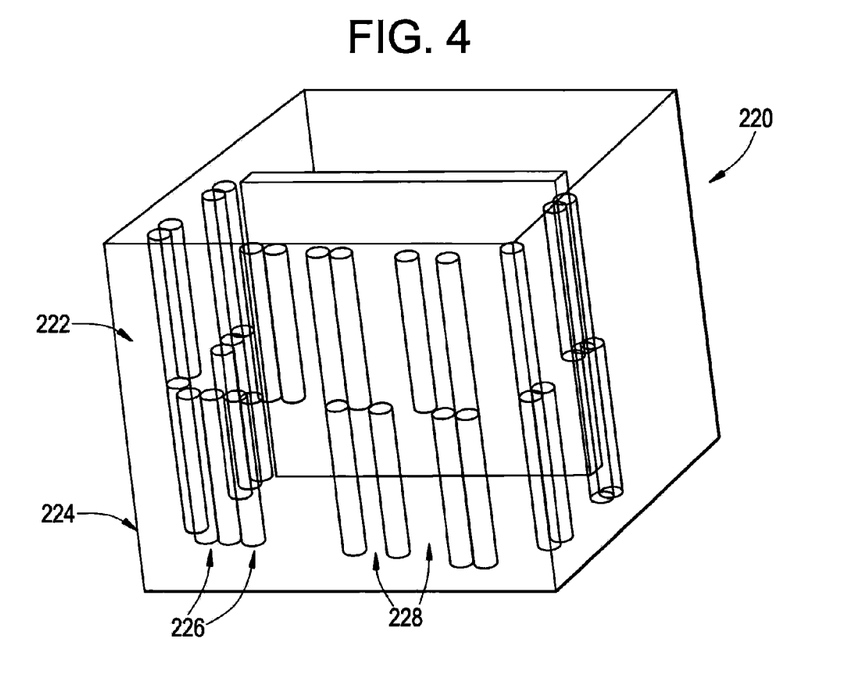
FIG. 4 schematically illustrates an exemplary embodiment of a non-linear mask comprising two tiers of a plurality of transparent and attenuating cylindrically shaped elements.

Again, each section of the mask 102 comprises open 114 and closed 116 regions. In one embodiment, each section of the mask can be a single piece (e.g., a sheet). In another embodiment, the open and closed regions of each mask section can be comprised of a plurality of individual transparent elements and attenuating elements. In an exemplary embodiment, the attenuating elements can be opaque. The transparent elements 202 can simply be empty space (e.g., voids or apertures) in the mask, or the elements can be comprised of a transparent material, which permits transmission of the radiation through the element and onto the PSD. In FIG. 4, the transparent elements 228 of the mask 220 are simply voids (e.g., empty spots) in the mask sections.

The elements can have any size, shape, and configuration suitable for providing the maximum system performance. Shapes can include, for example, cylindrical, rectangular, polygonal, planar, and the like. FIG. 4 illustrates an exemplary embodiment of an aperture mask 220 comprising a plurality of transparent elements 228 and attenuating elements 226, all having a cylindrical shape. The cylindrical elements can have any size, which will depend, among other things, on the size of the PSD. In the embodiment of FIG. 4, the elements have a 3-inch diameter. Both the attenuating and the transparent elements can have a length that extends the full length of the PSD, i.e., the element length extends from the top of the PSD to the bottom, thereby occupying the full length of the coded aperture mask. In another embodiment, the elements could have a length that is greater than the size of the PSD. In other embodiments, the elements extend only a portion of the length of the PSD. In these embodiments, therefore, multiple tiers of elements can be used to form the coded aperture mask and to completely cover the PSD. For example, FIG. 4 illustrates a two-tiered elemental mask 220, wherein the mask is split into an upper portion 222 and a lower portion 224 of cylindrical attenuating elements 226 and apertures 228. The length of the mask elements, therefore, is half the height of the overall PSD. Each portion of the two-tiered mask 220 can have a distinct permutation of the elements 226 to provide two-dimensional imaging. In other embodiments, the mask may have greater than two tiers. For example, in another embodiment, additional element tiers can be placed on top of the upper portion 222 and below the lower portion 224, such that all the mask element tiers together cover five sides of a box in front of the PSD. One of the advantages of having multiple tiers of elements in the mask array structure is that a multi-tiered non-linear mask allows the ability to locate the radiation source in a height direction as well since the two-tier pattern effectively define a mask pattern in the height direction.

Several methods exist to determine the placement of the attenuating and transparent elements in the coded aperture mask and they are well known to those skilled in the art. In one exemplary method, pseudo-noise sequences are used to determine the array element order in the mask. Pseudo-random or pseudo-noise (PN) sequences are well known in communications theory. These are binary sequences of length $2^m-1$, where m is an integer representing the number of digits in the sequence. For example, the sequence of m=3 is {101}. The sequence for m=4 is given by the cyclic permutation of the binary sequence {000100110101111}. The elements of the coded aperture array have assigned values of either 0 or 1, depending on whether the element is an attenuating (filled) element (value=1) or a transparent element (a void) (value=0). In one embodiment, therefore, the non-linear coded aperture mask as described herein can have a front section with a single PN sequence m=4, and side sections consisting of shorter PN sequences (e.g., m=3), wherein attenuating elements fill the one positions of the sequence and the zero positions are left open or filled with transparent elements. The constraint of the mask design is that the shadow pattern cast on the PSD is unique for a given source position to avoid ghosting. Therefore any mask pattern is allowed, provided that the mask pattern projected onto the PSD is unique for a given angle.

The non-linear mask as a whole can be constructed in a number of ways. For example, the mask elements can be affixed to a support structure, which could then be attached to the PSD structure. Exemplary methods of constructing the non-linear mask include any way of positioning the mask elements provided the pattern the elements form and their position relative to the PSD remains fixed. Such methods are well known to those having skill in the art.

The coded aperture mask 102 casts a shadow upon the PSD 106 and by observing the location of the shadow image on the PSD, the radiation source location can be determined. The non-linear mask of this disclosure can advantageously be employed with any PSD configured to operate with a standard linear mask. A radiation source can generally be treated as comprising multiple point sources, each of which emits radiation. Each of these point sources casts a particular shift of the coded aperture pattern on the PSD 106. Thus, many different shifts, corresponding to the different point sources comprising the radiation-emitting source, are superimposed on the detector. The PSD 106 provides detection signals corresponding to the pattern of the emitted radiation, and a processor (not shown) can subsequently characterize the object by reconstructing a visible image of the object. The image can then be sent to a display for illustrating the reconstructed object image.

The PSD 106 can comprise a two-dimensional detector array, where the detection plane elements correspond to either a defined region of a continuous detector, or individual detector units spanning the entire area in which the coded aperture casts a shadow. Conventional detector arrays, such as an Anger camera, including gamma cameras may be employed. In one embodiment, the PSD 106 can be an Infinia® gamma camera manufactured by General Electric. One suitable PSD arrangement, for example, is to employ a scintillating material in conjunction with a plurality of photomultipliers. Useful scintillators include sodium iodide, cesium iodide, gadolinium oxyorthosilicate (GSO), bismuth germinate (BSO), and lutethium oxyorthosilicate (LSO). The scintillators can be constructed as discrete elements or as a single large crystalline sheet. An array of photomultipliers (PMTs) is typically used in conjunction with the scintillator material to accurately record the incident radiation, including its energy and position. Other detectors could include noble gas ionization chambers or solid state materials such as high purity germanium, cadmium zinc telluride (CZT), or cadmium telluride. In an exemplary embodiment, the PSD 106 comprises four gamma cameras, for example the GE Infinia® gamma cameras described above, all tiled together. A standard GE Infinia® gamma camera comprises a one-inch thick planar sodium iodide thallium (NaI(Tl)) crystal scintillator, read out by an array of 95 PMTs. The signals from the multiple PMTs are used to reconstruct the position and energy of the interacting gamma rays. The dimension of each of the gamma cameras can very. Moreover, multiple cameras can be used (e.g. tiled together) to create a certain size class of PSD. For example, one of GE's standard Infinia® gamma cameras has a dimension of 54 cm by 40 cm. Four cameras, therefore, can be tiled together to create a one square meter-class PSD. As a note, tiling seams between the cameras are not considered an issue since the reconstruction methods can account for any non-responsive areas of the PSD. In an alternative embodiment, multiple PSDs could be placed oriented in different directions and each face could have an individual non-linear coded aperture mask. Such a PSD could locate a radiation source in virtually any direction relative to the detector.

In one embodiment, multiple non-linear masks and PSDs can be used in a coded aperture system. The non-linear masks can provide the system with a field of view of greater than about 2 radians in plane of travel and greater than about 0.5 radians perpendicular to plane of travel. The field of view can be even better in the case where multiple PSDs and masks are used. In such a system, it may be possible to have up to about 6 radians or greater in the plane of travel, and greater than about 1 radian perpendicular to the plane of travel.

Figure 5:
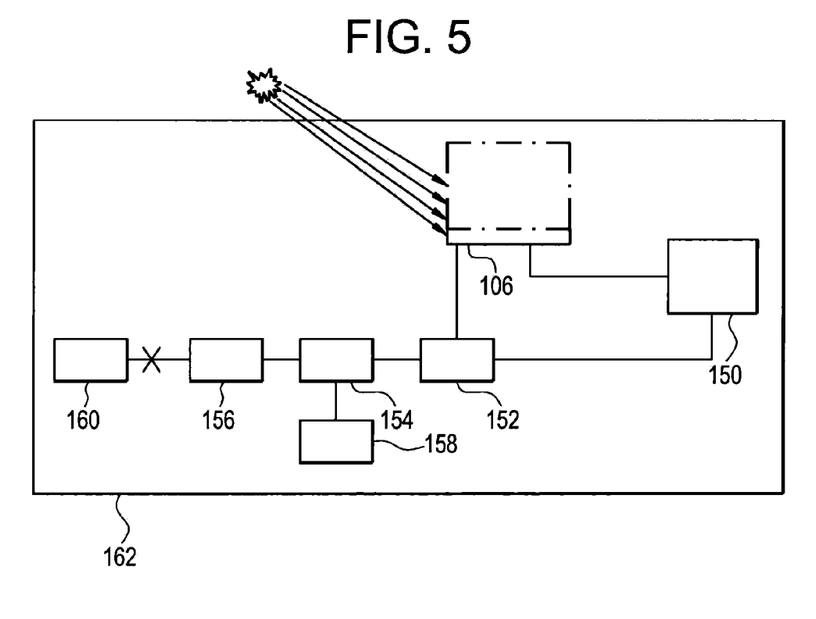
FIG. 5 schematically illustrates an exemplary embodiment of a detection system comprising a coded aperture with a non-linear mask.

As shown in FIG. 5, the PSD 106 can be powered by a power source 150 (e.g., a battery or a generator). The power source 150 can also power signal-processing electronics 152, a computer 154, a transmitter 156, a local transponder 158, and a receiver 160 for remote access. A portion or all of the imaging system can be further held within a container 162 for ease in transport.

The computer 154 (e.g., a personal computer) receives data from a multi-channel signal processor 152 and processes the information. Data processing includes reconstruction algorithms for the coded-aperture image. The computer 154 can be directly linked to the transmitter 156 so that the data can be sent.

Figure 6:
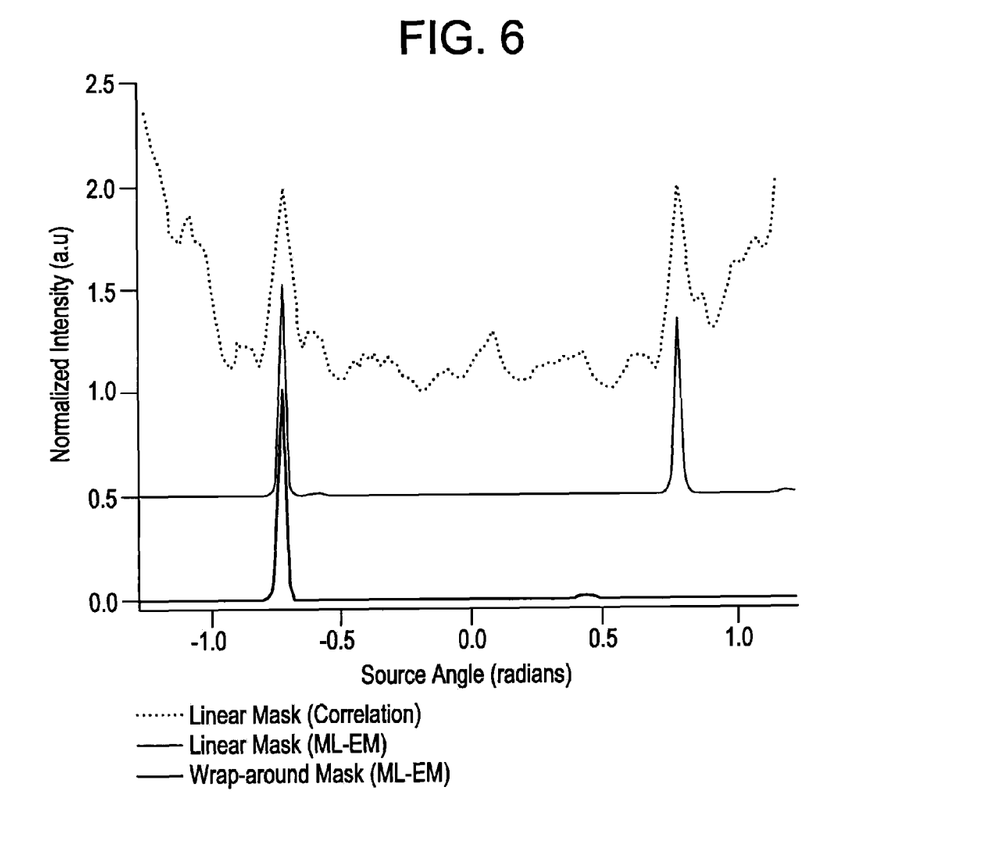
FIG. 6 graphically illustrates a comparison of an ML-EM source reconstruction of a non-linear aperture mask and a standard linear aperture mask.

Suitable software algorithms can be utilized to process the radiation measurements, and many such algorithms are well known in the art. In an exemplary embodiment, image reconstruction can rely on an iterative maximum likelihood estimation maximization (ML-EM) technique. In another embodiment, linear correlation techniques can be applied. FIG. 6 shows a comparison of ML-EM source reconstruction for a current linear aperture mask and the non-linear aperture mask as disclosed herein. The single radioactive source is located in the partially encoded region of the linear design mask. The mask-PSD separation, PSD properties, and mask element sizes are the same for both cases. The linear mask exhibits ghosting indicative of a radiation source outside the fully coded region of the mask. The ghosting is absent for the non-linear mask. The source position obtained from the standard correlation reconstruction technique (illustrated by the dotted line) shows the localization advantages of the ML-EM reconstruction approach for a stationary detector. With the ML-EM reconstruction method, it could be possible to locate a source to within about 10 meters at a distance of more than 100 meters with less than about 100 events detected in the PSD originating from the source. Note that the three curves are offset merely for clarity.

The results of FIG. 6 were obtained for a distant source (i.e. greater than 50 meters away) with parallel incident radiation, which is the "far-field" case. Such data can be combined with global positioning systems (GPS) and orientation data to provide absolute positioning via triangulation. In exemplary operation of the non-linear mask and radiation imaging system, the far-field algorithm can be used. The far-field algorithm assumes that the gamma rays from the source arrive at the PSD in parallel. The algorithm is based on the iterative ML-EM technique mentioned above. With this method, an initial source configuration is assumed, such as a uniform background, and the anticipated signal detected due to this source is calculated. Based on the discrepancies between the measured response, $y_i$, at pixel i of the PSD, and the anticipated response, the estimated source configuration ($S_j^{n+1}$) at location j is adjusted according to:

$$S_j^{n+1} = \frac{S_j^n}{\sum_i P_{ij}} \sum_i p_{ij} \frac{y_i}{\sum_k p_{ik} S_k^n} \qquad \text{Equation 1}$$

where $p_{ij}$ is the probability that a source at position j will be detected at pixel i, and n is the iteration number. The process can be repeated until either a fixed number of iterations are performed or the solution converges. Again, combining the reconstructed source direction with information from a dual-frequency GPS and orientation sensors can provide the final source position via triangulation.

A second method of reconstruction and source localization can be suitable when the source is near-field (i.e., less than about 25 meters from the PSD). In this method, the diverging gamma rays from the source will cause the mask image to magnify on the PSD. By examining the spread and position of the source's projected shadow, it can be possible to determine the source's angular position and distance of the source relative to the detector, without moving the detector. This method can provide good location knowledge and allows the system to be used where triangulation is not practical, for example, in dense urban environments, parking structures, and the like.

While the reconstructions algorithms described above illustrate potential reconstruction techniques, several other methods exist. These include, but are not limited to, correlation processing, ordered subset estimation maximization (OSEM), synthetic aperture processing, and the like. All are well known by those having skill in the art.

Figure 7:
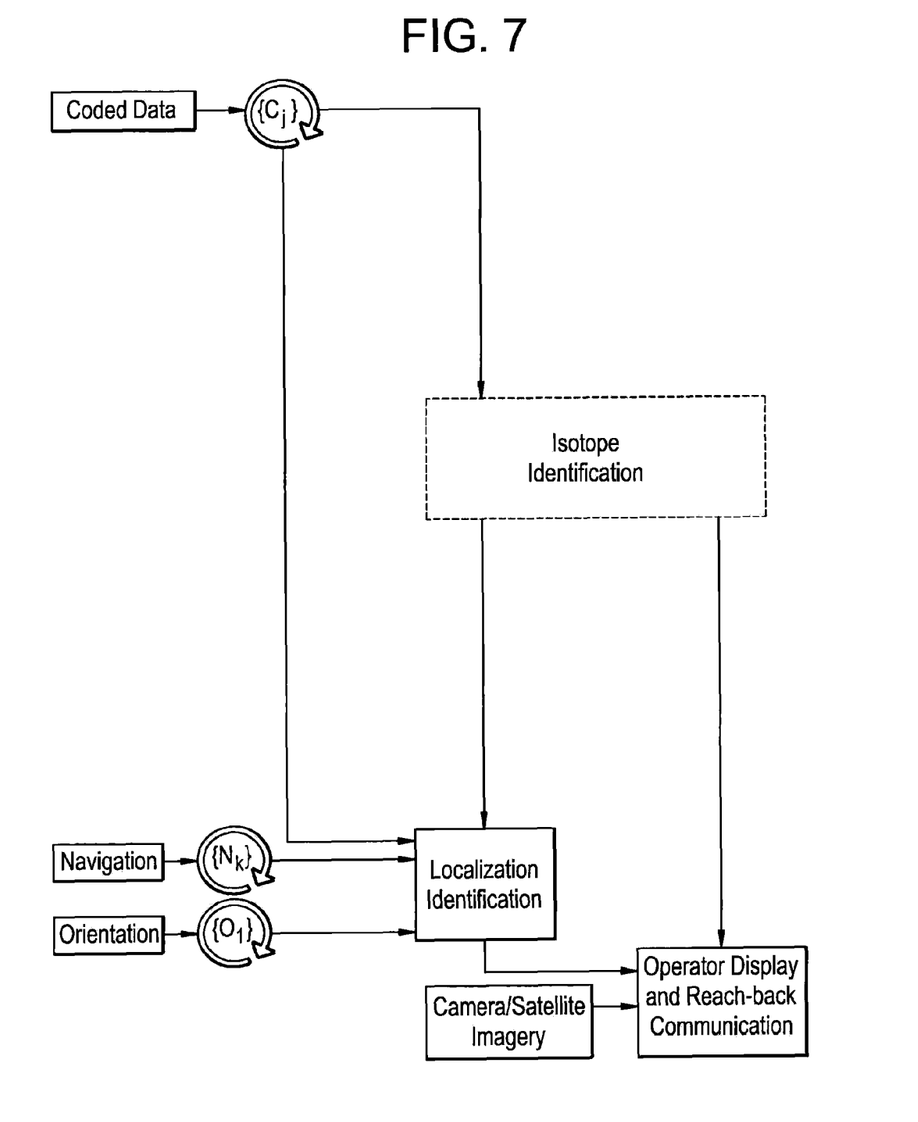
FIG. 7 is a flow diagram illustrating an exemplary embodiment of the stand-off radiation imaging and detection system.

As stated above, the entire coded aperture and system components can be packaged together to make a single stand-off radiation detection system unit, which can advantageously fit inside a commercial SUV, van, pick-up truck, helicopter, boat, or the like. The system will function as a mobile unit for detecting and locating a radiation source in a range of several meters to greater than 100 meters from the detector. FIG. 7 illustrates a flow diagram of an exemplary embodiment of the system in operation. Coded data ($C_j$) can be obtained from the PSD and contains both energy and position information from gamma rays emitted by the source to determine the source location, as well as to provide spectral information about isotopes. The navigation ($N_k$) and orientation ($O_1$) data can also be used from their respective modules.

Advantageously, the use of a non-linear mask as described herein can allow for a wider field of view for a given position-sensitive detector, and thereby reduce the size a system employing the coded aperture for detecting and imaging radiation sources. This reduced system size advantageously permits the system to be contained in a mobile unit, such as the cargo compartment of an SUV for example. The stand-off radiation imaging system can, therefore, be used to actively search cities and other areas of high probability of a nuclear attack wherein current imaging systems are impractical or ineffective for use.

The terminology used herein is for the purpose of describing particular embodiments only and is not intended to be limiting of the invention. Ranges disclosed herein are inclusive and combinable (e.g., ranges of "up to about 25 wt %, or, more specifically, about 5 wt % to about 20 wt %", is inclusive of the endpoints and all intermediate values of the ranges of "about 5 wt % to about 25 wt %," etc.). "Combination" is inclusive of blends, mixtures, alloys, reaction products, and the like. Furthermore, the terms "first," "second," and the like, herein do not denote any order, quantity, or importance, but rather are used to distinguish one element from another, and the terms "a" and "an" herein do not denote a limitation of quantity, but rather denote the presence of at least one of the referenced item. The modifier "about" used in connection with a quantity is inclusive of the stated value and has the meaning dictated by context, (e.g., includes the degree of error associated with measurement of the particular quantity). The suffix "(s)" as used herein is intended to include both the singular and the plural of the term that it modifies, thereby including one or more of that term (e.g., the colorant(s) includes one or more colorants). Reference throughout the specification to "one embodiment", "another embodiment", "an embodiment", and so forth, means that a particular element (e.g., feature, structure, and/or characteristic) described in connection with the embodiment is included in at least one embodiment described herein, and may or may not be present in other embodiments. In addition, it is to be understood that the described elements may be combined in any suitable manner in the various embodiments.

Unless otherwise defined, all terms (including technical and scientific terms) used herein have the same meaning as commonly understood by one of ordinary skill in the art to which the embodiments of the invention belong. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

While embodiments of the invention have been described with reference to exemplary embodiments, it will be understood by those skilled in the art that various changes can be made and equivalents can be substituted for elements thereof without departing from the scope of the embodiments of the invention. In addition, many modifications can be made to adapt a particular situation or material to the teachings of embodiments of the invention without departing from the essential scope thereof. Therefore, it is intended that the embodiments of the invention not be limited to the particular embodiment disclosed as the best mode contemplated for carrying out this invention, but that the embodiments of the invention will include all embodiments falling within the scope of the appended claims.

The invention claimed is:

1. A coded aperture detector, comprising:
   a position sensitive detector configured to observe the location of emitted radiation; and
   a mask disposed in front of the position sensitive detector, the mask comprising:
   a non-linear shape configured to define a perimeter around the position sensitive detector;
   a width less than or about equal to a width of the position sensitive detector; and
   a plurality of attenuating and transparent elements of a predetermined configuration, the elements positioned such that the emitted radiation is detected by the position sensitive detector after passage through the mask.

2. The coded aperture detector of claim 1, wherein the non-linear shape is a shape selected from the group comprising rectangular, triangular, arcuate, and polygonal.

3. The coded aperture detector of claim 1, wherein the mask has a U-shape and comprises a front section disposed parallel to the position sensitive detector and two side sections disposed perpendicular to the front section and extending from the front section down to sides of the position sensitive detector.

4. The coded aperture detector of claim 1, wherein a field of view of the coded aperture detector is equal to or greater than 2 radians.

5. The coded aperture detector of claim 1, wherein each of the plurality of mask elements has a shape comprising at least one of a cylindrical shape, a planar shape, a rectangular shape, and a polygonal shape.

6. The coded aperture detector of claim 1, wherein the each of the plurality of transparent elements is defined by an aperture.

7. The coded aperture detector of claim 1, wherein the plurality of attenuating and transparent elements comprises two or more tiers, and wherein each of the two or more tiers has a predetermined configuration.

8. The coded aperture detector of claim 7, wherein a length of each of the elements is the same and is the height of the position sensitive detector divided by the number of tiers.

9. The coded aperture of claim 7, wherein each of the two or more tiers has a different predetermined configuration from the others of the two or more tiers.

10. A coded aperture detector, comprising:
    a position sensitive detector configured to observe the location of a radiation source; and
    a mask comprising a plurality of attenuating and transparent elements disposed in front of the position sensitive detector, wherein the mask has a non-linear shape configured to define a perimeter around the position sensitive detector, wherein the mask comprises a width less than or about equal to a width of the position sensitive detector, and wherein at least a portion of the mask is spaced less than about 10 centimeters from the position sensitive detector to form the perimeter.

11. The coded aperture detector of claim 10, wherein the non-linear shape is a shape selected from the group comprising rectangular, triangular, arcuate, and polygonal.

12. The coded aperture detector of claim 10, wherein the mask has a U-shape and comprises a front section disposed parallel to the position sensitive detector and two side sections disposed perpendicular to the front section and extending from the front section down to sides of the position sensitive detector, thereby forming the perimeter.

13. The coded aperture detector of claim 10, wherein a field of view of the coded aperture is greater than or equal to 2 radians.

14. The coded aperture detector of claim 10, wherein each of the plurality of attenuating elements comprises a cylindrical shape.

15. The coded aperture detector of claim 10, wherein each of the plurality of attenuating elements comprises a rectangular shape.

16. The coded aperture of claim 10, wherein each of the plurality of transparent elements is defined by an aperture.

17. The coded aperture of claim 10, wherein the mask further comprises two or more tiers of the plurality of attenuating and transparent elements in the predetermined configuration.

18. The coded aperture of claim 17, wherein a length of each of the elements is the same and is the value of a height of the position sensitive detector divided by the number of tiers.

19. A method of detecting a radiation source comprising:
    loading a stand-off radiation imaging and detection system aboard a vehicle, wherein the system is configured to detect the radiation source and comprises a mask disposed in front of a position sensitive detector, wherein the mask has a non-linear shape configured to define a perimeter around the position sensitive detector, wherein the mask comprises a width less than or about equal to a width of the position sensitive detector, wherein the mask comprises a plurality of attenuating and transparent elements of a predetermined configuration, positioned such that the emitted radiation is detected by the position sensitive detector after passage through the mask, and wherein the detector has a field of view of greater than 2 radians;
    recording detection of gamma radiation by the system; and
    determining the location of the radiation source.

20. The method of claim 19, wherein the vehicle is selected from the group comprising a sport-utility vehicle, a cargo trailer, a pick-up truck, a cargo van, a watercraft, and an aircraft.

* * * * *